(12) United States Patent
Takahashi et al.

(10) Patent No.: US 7,985,823 B2
(45) Date of Patent: Jul. 26, 2011

(54) PRODUCTION METHOD OF POLYCARBONATE RESIN

(75) Inventors: Kazuyuki Takahashi, Fukuoka (JP); Kouji Iwaki, Fukuoka (JP); Ryuuji Uchimura, Fukuoka (JP)

(73) Assignee: Mitsubishi Chemical Corporation, Tokyo (JP)

( * ) Notice: Subject to any disclaimer, the term of this patent is extended or adjusted under 35 U.S.C. 154(b) by 66 days.

(21) Appl. No.: 12/519,205

(22) PCT Filed: Sep. 25, 2007

(86) PCT No.: PCT/JP2007/068571
§ 371 (c)(1),
(2), (4) Date: Jun. 15, 2009

(87) PCT Pub. No.: WO2008/075490
PCT Pub. Date: Jun. 26, 2008

(65) Prior Publication Data
US 2010/0036087 A1 Feb. 11, 2010

(30) Foreign Application Priority Data
Dec. 18, 2006 (JP) .................................. 2006-340464

(51) Int. Cl.
*C08G 63/02* (2006.01)
*C08G 63/00* (2006.01)
(52) U.S. Cl. ........................................ 528/196; 528/198
(58) Field of Classification Search .................. 528/196, 528/198
See application file for complete search history.

(56) References Cited

U.S. PATENT DOCUMENTS

| 5,601,768 | A * | 2/1997 | Kurihara et al. ............... 264/131 |
| 6,323,302 | B1 | 11/2001 | Sasaki et al. |
| 2008/0234445 | A1 | 9/2008 | Hamano et al. |

FOREIGN PATENT DOCUMENTS

| CN | 1194656 A | 9/1998 |
| CN | 1266443 A | 9/2000 |
| EP | 0 992 522 A1 | 4/2000 |
| JP | 6 56984 | 3/1994 |
| JP | 2000 63507 | 2/2000 |
| JP | 2002 363276 | 12/2002 |
| JP | 2003 138001 | 5/2003 |
| JP | 2004 197004 | 7/2004 |
| JP | 2006-335867 | 12/2006 |
| WO | 99 55764 | 11/1999 |

OTHER PUBLICATIONS

Office Action issued Dec. 7, 2010, in China Patent Application No. 200780043073.7 (with English-language Translation).
Singaporean Office Action issued Sep. 30, 2010, in Singaporean Patent Application No. 2009034273.
Office Action issued Oct. 1, 2010, in Russian Patent Application No. 2009127771 with English language translation.
Korean Office Action issued May 16, 2011, in Korean Patent Application No. 2008-7027537, filed Sep. 25, 2007 (with English-language Translation).

* cited by examiner

Primary Examiner — Terressa M Boykin
(74) Attorney, Agent, or Firm — Oblon, Spivak, McClelland, Maier & Neustadt, L.L.P.

(57) ABSTRACT

The invention aims at providing a process for the production of polycarbonate resin which is suppressed in discoloration and reduced in the content of crystalline foreign substance, gel, and so on. The invention relates to a process for the production of polycarbonate resin from raw materials, namely, an aromatic dihydroxyl compound and a carbonic diester through continuous transesterification by the use of a production unit provided with plural reactors, which comprises producing continuously an aromatic polycarbonate resin having a viscosity-average molecular weight of 10,000 to 20,000 for a prescribed time before the termination of the continuous transesterification, discharging the polymerization fluid, cleaning the insides of the reactors with a mixture of the raw materials and then with an aromatic monohydroxy compound, feeding the raw materials and a catalyst to the reactors after the internal temperatures and degrees of vacuum of the reactors have reached respectively to levels falling within −5% to +5% of the levels preset for manufacturing operation, and then initiating manufacturing operation again.

6 Claims, 1 Drawing Sheet

[FIG. 1]
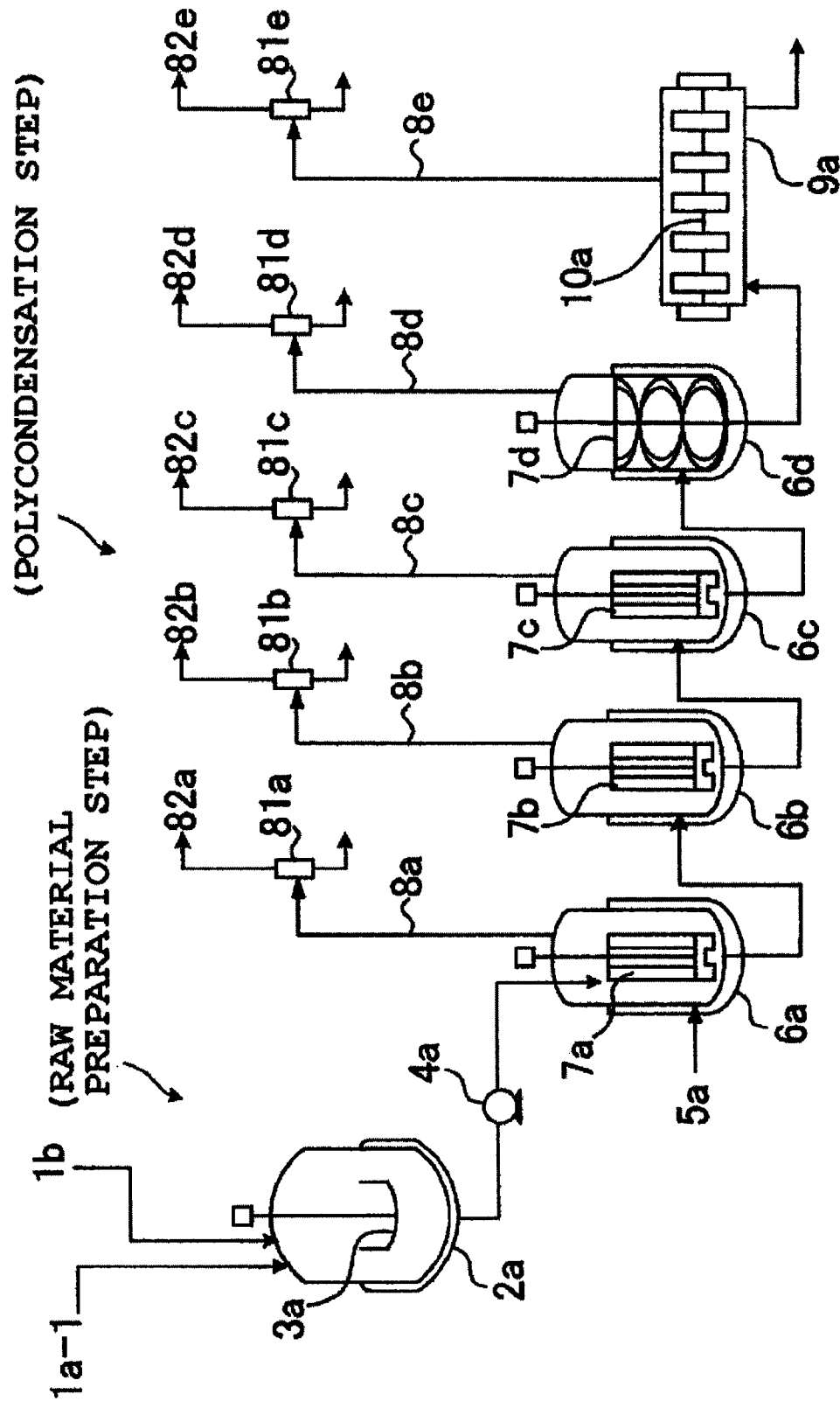

PRODUCTION METHOD OF POLYCARBONATE RESIN

TECHNICAL FIELD

The present invention relates to a production method of a polycarbonate resin. More particularly, it relates to a continuous production method of a polycarbonate resin.

BACKGROUND ART

Conventionally, an interface method of directly reacting bisphenols and carbonyl chloride, and a melt method of polycondensation reacting bisphenols and a carbonic diester by an ester exchange reaction are known as a production method of an aromatic polycarbonate resin. Above all, the melt method by an ester exchange reaction has the advantage that an aromatic polycarbonate resin can inexpensively be produced as compared with the interface method.

The melt method conducts a polycondensation reaction at high temperature under high vacuum, and therefore, a polycarbonate resin formed is liable to color. For this reason, a production method of using a stainless steel-made reactor washed with a liquid containing an aromatic hydroxy compound is reported as a method of preventing such a coloration of a resin (see Patent Document 1).

Furthermore, a method wherein after stopping a melt polymerization reaction, a molten reactant is withdrawn, a resin remained in a reaction tank or the like is dissolved and washed with a washing liquid containing a monohydroxy compound, a carbonic diester and the like within 24 hours, and the inside of an apparatus is held under an inert gas atmosphere is reported (see Patent Document 2).

[Patent Document 1] JP-A-6-056984
[Patent Document 2] JP-A-2004-197004

DISCLOSURE OF THE INVENTION

Problems that the Invention is to Solve

By the way, where an aromatic polycarbonate resin is continuously produced using a production apparatus comprising plural reactors connected in series, a method of starting a melt polymerization reaction includes a so-called batch start.

In the batch start, a molten reactant is previously introduced into a reactor until a liquid level, temperature rising and pressure reduction operations in a reactor are gradually conducted, and after reaching the predetermined inner temperature and degree of vacuum, a melt polymerization reaction is started.

However, the batch start requires time until the inner temperature and degree of vacuum in each reactor reach the predetermined values. Therefore, residence time is spent more than necessary. As a result, crystallized foreign matters and foreign matters such as gel and scorch are generated in an aromatic polycarbonate resin obtained, resulting in further cause of coloration.

Where a melt polymerization reaction was stopped and a molten reactant is withdrawn, when an operation of withdrawing the molten reactant from a purge valve provided at the respective bottom of plural reactors is conducted, liquid reservoir is formed on a space portion of a purge valve of each reactor, and there is the problem that this gives rise to the cause of foreign matters such as scorch in the next production.

To wash the inside of a reactor with a washing liquid containing phenol, carbonic diester and the like after stopping the melt polymerization reaction and withdrawing the molten reactant, a large amount of phenol is required.

The present invention has been made to solve such problems in a production method of a polycarbonate resin.

That is, an object of the present invention is to provide a production method of a polycarbonate resin showing less coloration and containing reduced crystallized foreign matters and foreign matters such as gel.

Means for Solving the Problems

According to the present invention, there is provided a production method of a polycarbonate resin which is a method of continuously producing a polycarbonate resin by an ester exchange reaction using a dihydroxy compound and a carbonic diester as raw materials, and is characterized in that before using a reactor in which the ester exchange reaction is conducted, inner temperature and degree of vacuum of the reactor are set to the predetermined values at which the ester exchange reaction is conducted, and after the inner temperature and degree of vacuum of the reactor reach in a range of from −5% to +5% of the predetermined values, raw materials are supplied to the reactor to start the ester exchange reaction.

The dihydroxy compound used as a component of the raw materials is preferably an aromatic dihydroxy compound.

Next, according to the present invention, there is provided a production method of a polycarbonate resin which is a method of continuously producing a polycarbonate resin by an ester exchange reaction between a dihydroxy compound and a carbonic diester, and is characterized in that before stopping the ester exchange reaction, a polycarbonate resin having a viscosity average molecular weight (Mv) of from 10,000 to 20,000 is continuously produced for a prescribed period of time.

The dihydroxy compound as the raw material component is preferably an aromatic dihydroxy compound, and after stopping the ester exchange reaction, a reactor in which the ester exchange reaction is conducted is preferably washed with a molten mixture of an aromatic dihydroxy compound and a carbonic diester.

Furthermore, after stopping the ester exchange reaction, the reactor in which an ester exchange reaction is conducted is preferably washed with a molten mixture of an aromatic dihydroxy compound and a carbonic diester, and subsequently washed with an aromatic monohydroxy compound.

In this case, before washing the reactor, a molten reactant is preferably discharged from the reactor.

According to the present invention, there is further provided a production method of an aromatic polycarbonate resin which is a method of continuously producing an aromatic polycarbonate resin by an ester exchange reaction using an aromatic dihydroxy compound and a carbonic diester as raw materials, and is characterized in that before stopping the ester exchange reaction, an aromatic polycarbonate resin having a viscosity average molecular weight (Mv) of from 10,000 to 20,000 is continuously produced for a prescribed period of time; after stopping the ester exchange reaction, a reactor in which the ester exchange reaction is conducted is washed with a molten mixture of the aromatic dihydroxy compound and the carbonic diester; before again starting the ester exchange reaction, the inner temperature and degree of vacuum of the reactor are set to the predetermined values at which the ester exchange reaction is conducted; and after the inner temperature and degree of vacuum of the reactor reach in a range of from −5% to +5% of the predetermined values, the raw materials are supplied to the reactor to start the ester exchange reaction.

Advantage of the Invention

According to the production method of a polycarbonate resin of the present invention, a polycarbonate resin showing less coloration and containing reduced crystallized foreign matters and foreign matters such as gel is obtained.

BRIEF DESCRIPTION OF THE DRAWING

FIG. 1 is a view showing one example of a production apparatus of an aromatic polycarbonate.

DESCRIPTION OF REFERENCE NUMERALS AND SIGNS 1a-1 . . . Diphenyl carbonate supply port
1b . . . Bisphenol A supply port
2a . . . Raw material mixing tank
3a . . . Anchor type stirring blade
4a . . . Raw material supply pump
5a . . . Catalyst supply port
6a . . . First vertical stirring reactor
6b . . . Second vertical stirring reactor
6c . . . Third vertical stirring reactor
6d . . . Fourth vertical stirring reactor
7a, 7b, 7c . . . MAXBLEND blade
7d . . . Helical ribbon blade
8a, 8b, 8c, 8d, 8e . . . Distillation pipe
9a . . . Fifth horizontal stirring reactor
10a . . . Stirring blade
81a, 81b, 81c, 81d, 81e . . . Condenser
82a, 82b, 82c, 82d, 82e . . . Pressure reducing device

BEST MODE FOR CARRYING OUT THE INVENTION

The best mode for carrying out the invention (hereinafter, the embodiment of the invention) is described in detail below. The present invention is not limited to the following embodiments, and can carry out with various modifications within a scope of its gist. Further, the drawings used are to explain the present embodiment, and do not show the actual size.
(Polycarbonate)

A polycarbonate used in the present embodiment is produced by an ester exchange reaction between a dihydroxy compound and a carbonic diester.

The dihydroxy compound preferably includes an aromatic dihydroxy compound. The polycarbonate preferably includes an aromatic polycarbonate produced by a melt polycondensation based on an ester exchange reaction between an aromatic dihydroxy compound and a carbonic diester.

A method of producing an aromatic polycarbonate by continuously conducting a melt polycondensation reaction using an aromatic dihydroxy compound and a carbonic diester as raw materials in the presence of an ester exchange catalyst (melt process) is described below.
(Aromatic Dihydroxy Compound)

The aromatic dihydroxy compound used in the present embodiment includes a compound represented by the following general formula (1).

General Formula (1)

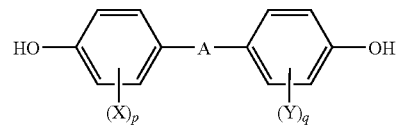

[Chem. 1]

In the general formula (1), A represents a single bond, a straight-chain, branched or cyclic divalent hydrocarbon group having from 1 to 10 carbon atoms which may be substituted, or a divalent group represented by —O—, —S—, —CO— or —SO$_2$—. X and Y represent a halogen atom or a hydrocarbon group having from 1 to 6 carbon atoms. p and q are an integer of 0 or 1. X and Y, and p and q may be the same or different, respectively.

Specific examples of the aromatic dihydroxy compound include bisphenols such as bis(4-hydroxydiphenyl)methane, 2,2-bis(4-hydroxyphenyl)propane, 2,2-bis(4-hydroxy-3-methylphenyl)propane, 2,2-bis(4-hydroxy-3-t-butylphenyl)propane, 2,2-bis(4-hydroxy-3,5-dimethylphenyl)propane, 2,2-bis(4-hydroxy-3,5-dibromophenyl)propane, 4,4-bis(4-hydroxyphenyl)heptane and 1,1-bis(4-hydroxyphenyl)-cyclohexane; biphenols such as 4,4'-dihydroxybiphenyl and 3,3',5,5'-tetramethyl-4,4'-dihydroxybiphenyl; bis(4-hydroxyphenyl)sulfone, bis(4-hydroxyphenyl)sulfide, bis(4-hydroxyphenyl)ether, and bis(4-hydroxyphenyl)ketone.

Of those, 2,2-bis(4-hydroxyphenyl)propane (bisphenol A, hereinafter sometimes abbreviated as BPA) is preferable. Those aromatic dihydroxy compounds can be used alone or as mixtures of two or more thereof.
(Carbonic Diester)

The carbonic diester used in the present embodiment includes a compound represented by the following general formula (2)

[Chem. 2]

General Formula (2)

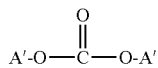

In the general formula (2), A' represents a straight-chain, branched or cyclic monovalent hydrocarbon group having from 1 to 10 carbon atoms which may be substituted. Two A's may be the same or different.

Examples of the substituent on A' include a halogen atom, an alkyl group having from 1 to 10 carbon atoms, an alkoxy group having from 1 to 10 carbon atoms, a phenyl group, a phenoxy group, a vinyl group, a cyano group, an ester group, an amido group and nitro group.

Specific examples of the carbonic diester include diphenyl carbonate; a substituted diphenyl carbonate such as ditolyl carbonate; and a dialkyl carbonate such as dimethyl carbonate, diethyl carbonate and di-t-butyl carbonate.

Of those, diphenyl carbonate (hereinafter sometimes abbreviated as DPC) and a substituted diphenyl carbonate are preferable. Those carbonic diesters can be used alone or as mixtures of two or more thereof.

The carbonic diester may be replaced by dicarboxylic acid or dicarboxylic ester in an amount of preferably 50 mol % or less, and more preferably 30 mol % or less.

The representative dicarboxylic acid or dicarboxylic ester includes terephthalic acid, isophthalic acid, diphenyl terephthalate and diphenyl isophthalate. When the carbonic diester is replaced by such a dicarboxylic acid or dicarboxylic ester, a polyester carbonate is obtained.

Those carbonic diesters (including the above replaced dicarboxylic acid or dicarboxylic ester, and hereinafter the same) are used in an amount excess to the aromatic dihydroxy compound.

Specifically, the carbonic diester is used in a molar ratio of generally from 1.01 to 1.30, and preferably from 1.02 to 1.20, to the aromatic dihydroxy compound. Where the molar ratio is excessively small, terminal OH group of the aromatic polycarbonate obtained increases, and there is the tendency that thermal stability of a resin deteriorates. On the other hand, where the molar ratio is excessively large, reaction rate of the ester exchange reaction lowers, and there is the tendency that it is difficult to produce an aromatic polycarbonate having the desired molecular weight. Additionally, residual amount of a carbonic diester in a resin increases, and this may result in the cause of odor at the time of processing and forming a molded product, which is not preferred.

(Ester Exchange Catalyst)

The ester exchange catalyst used in the present embodiment includes catalysts generally used in producing a polycarbonate by an ester exchange method, and is not particularly limited. In general, examples of the catalyst include basic compounds such as an alkali metal compound, an alkaline earth metal compound, a basic boron compound, a basic phosphorus compound, a basic ammonium compound, and an amine compound.

Of those ester exchange catalysts, an alkali metal compound is practically desirable. Those ester exchange catalysts may be used alone or as mixtures of two or more thereof.

The ester exchange catalyst is used in a range of generally from $1\times10^{-9}$ to $1\times10^{-1}$ mol, and preferably from $1\times10^{-7}$ to $1\times10^{-2}$ mol, per mole of the aromatic dihydroxy compound.

The alkali metal compound includes inorganic alkali metal compounds such as hydroxides, carbonates and hydrogen carbonate compounds of alkali metals; and organic alkali metal compounds such as salts of alkali metals with alcohols, phenols or organocarboxylic acids. Examples of the alkali metal include lithium, sodium, potassium, rubidium and cesium.

Of those alkali metal compounds, a cesium compound is preferable, and cesium carbonate, cesium hydrogen carbonate and cesium hydroxide are particularly preferable.

Examples of the alkaline earth metal compound include inorganic alkaline earth metal compounds such as hydroxides or carbonates of alkaline earth metals; and salts of alkaline earth metals with alcohols, phenols and organocarboxylic acids. Examples of the alkaline earth metal include calcium, strontium and barium.

Examples of the basic boron compound include a sodium salt, a potassium salt, a lithium salt, a calcium salt, a magnesium salt, a barium salt and a strontium salt of a boron compound. Examples of the boron compound include tetramethyl boron, tetraethyl boron, tetrapropyl boron, tetrabutyl boron, trimethylethyl boron, trimethylbenzyl boron, trimethylphenyl boron, triethyl-methyl boron, triethylbenzyl boron, triethylphenyl boron, tributylbenzyl boron, tributylphenyl boron, tetraphenyl boron, benzyltriphenyl boron, methyltriphenyl boron and butyltriphenyl boron.

Examples of the basic phosphorus compound include trivalent phosphorus compounds such as triethylphosphine, tri-n-propylphosphine, triisopropylphosphine, tri-n-butyl-phosphine, triphenylphosphine and tributylphosphine; and quaternary phosphonium salts derived from those compounds.

Examples of the basic ammonium compound include tetramethylammonium hydroxide, tetraethylammonium hydroxide, tetrapropylammonium hydroxide, tetrabutyl-ammonium hydroxide, trimethylethylammonium hydroxide, trimethylbenzylammonium hydroxide, trimethylphenylammonium hydroxide, triethylmethylammonium hydroxide, triethyl-benzylammonium hydroxide, triethylphenylammonium hydroxide, tributylbenzylammonium hydroxide, tributylphenylammonium hydroxide, tetraphenylammonium hydroxide, benzyltriphenyl-ammonium hydroxide, methyltriphenylammonium hydroxide and butyltriphenylammonium hydroxide.

Examples of the amine compound include 4-amino-pyridine, 2-aminopyridine, N,N-dimethyl-4-aminopyridine, 4-diethylaminopyridine, 2-hydroxypyridine, 2-methoxy-pyridine, 4-methoxypyridine, 2-dimethylaminoimidazole, 2-methoxyimidazole, imidazole, 2-mercaptoimidazole, 2-methylimidazole and aminoquinoline.

(Production Method of Aromatic Polycarbonate)

A production method of an aromatic polycarbonate is described below.

The production of an aromatic polycarbonate is conducted by preparing a molten mixture of an aromatic dihydroxy compound and a carbonic diester compound as raw materials (raw material preparation step) and subjecting those compounds to a multi-stage polycondensation reaction in the presence of an ester exchange reaction catalyst under a molten state using plural reactors (polycondensation step). The reaction method may be any of a batchwise method, a continuous method, and a combination of a batchwise method and a continuous method. The reactors used comprise a plurality of vertical reactors and the subsequent at least one horizontal reactor. In general, those reactors are arranged in series, and treatment is conducted continuously.

After the polycondensation step, the reaction is stopped, and a step of devolatilization removing unreacted raw materials and reaction by-products in a molten reactant, a step of adding a heat stabilizer, a release agent, a colorant and the like, a step of forming the aromatic polycarbonate into pellets having a given particle size, and other steps may appropriately be added.

Each step of the production method is described below.

(Raw Material Preparation Step)

An aromatic dihydroxy compound and a carbonic diester used as raw materials of an aromatic polycarbonate are generally prepared as a molten mixture of raw materials using a batchwise, semibatchwise or continuous stirring tank type apparatus in an atmosphere of an inert gas such as nitrogen or argon. For example, in the case of using bisphenol A as the aromatic dihydroxy compound and diphenyl carbonate as the carbonic diester, temperature of melt mixing is selected from a range of generally from 20 to 180° C., and preferably from 125 to 160° C.

In this case, proportions of the aromatic dihydroxy compound and the carbonic diester are adjusted such that the carbonic diester is excess, and are adjusted such that the carbonic diester is a proportion of generally from 1.01 to 1.30 mol, and preferably from 1.02 to 1.20 mol, per mole of the aromatic dihydroxy compound.

(Polycondensation Step)

Polycondensation by an ester exchange reaction between the aromatic dihydroxy compound and the carbonic diester is continuously conducted by a multi-stage step of generally 2 stages or more, and preferably from 3 to 7 stages. Specific reaction conditions are that temperature is in a range of from 150 to 320° C., pressure is in a range of from normal pressures to 0.01 Torr (1.33 Pa), and an average residence time is in a range of from 5 to 150 minutes.

In each reactor of a multi-stage step, further high temperature and further high degree of vacuum are set stepwise within the above reaction conditions in order to further effectively discharge phenol by-produced with the progress of the polycondensation reaction outside the system. It is preferable to set to a temperature as low as possible and a residence time as short as possible to prevent deterioration of quality such as hue of the aromatic polycarbonate obtained.

Where the polycondensation step is conducted by a multi-stage step, generally a plurality of reactors including a vertical stirring reactor are provided, thereby increasing an average molecular weight of a polycarbonate resin. The reactors provided are generally 3 to 6, and preferably 4 to 5.

Examples of the reactor used include a stirring tank type reactor, a thin film reactor, a centrifugal thin film evaporation reactor, a surface renewal type twin-screw kneading reactor, a twin-screw horizontal stirring reactor, a wet wall type reactor, a perforated plate type reactor which polymerizes while freely dropping, and a wire-equipped perforated plate type reactor which polymerizes while dropping along the wire.

Examples of the type of the stirring blade in the vertical stirring reactor include a turbine blade, paddle blade, a fardler blade, an anchor blade, a FULLZONE blade (manufactured by Shinko Pantek Co., Ltd.), a sanmeler blade (manufactured by Mitsubishi Heavy Industries, Ltd.), a MAXBLEND blade (manufactured by Sumitomo Heavy Industries, Ltd.), a helical ribbon blade, and a lattice-type twisting blade (manufactured by Hitachi, Ltd.).

Furthermore, the horizontal stirring reactor means a reactor that an axis of revolution of a stirring blade is horizontal (horizontal direction). Examples of the stirring blade in the horizontal stirring reactor include single shaft stirring blades such as a disc type and a paddle type, and two-shaft stirring blades such as HVR, SCR, N-SCR (manufactured by Mitsubishi Heavy Industries, Ltd.), Bivolac (manufactured by Sumitomo Heavy Industries, Ltd.), a spectacle-shaped blade and a lattice-type blade (manufactured by Hitachi, Ltd.).

The ester exchange catalyst used in polycondensation between the aromatic dihydroxy compound and the carbonic diester compound is generally previously provided as an aqueous solution. Concentration of the catalyst aqueous solution is not particularly limited, and adjusted to an optional concentration according to solubility of a catalyst in water. Other solvent such as acetone, alcohol, toluene or phenol can be selected in place of water.

Properties of water used for dissolution of the catalyst are not particularly limited so long as kind and concentration of impurities contained are constant. In general, distilled water, deionized water and the like are preferably used.

(Production Apparatus)

One example of the production method of an aromatic polycarbonate to which the present embodiment is applied is specifically described below based on the Drawing.

FIG. 1 is a view showing one example of a production apparatus of an aromatic polycarbonate. In the production apparatus shown in FIG. 1, an aromatic polycarbonate is produced through a raw material preparation step which prepares an aromatic dihydroxy compound and a carbonic diester as raw materials, and a polycondensation step which conducts a polycondensation reaction of those raw materials in a molten state using plural reactors.

Subsequently, the reaction is stopped, and pellets of the aromatic polycarbonate are formed through a step of devolatilization removing unreacted raw materials and reaction by-products in a molten reactant (not shown), a step of adding a heat stabilizer, a release agent, a colorant and the like (not shown), and a step of forming the aromatic polycarbonate into pellets having a given particle size (not shown).

A raw material mixing tank 2a and a raw material supply pump 4a for supplying the raw materials prepared to a polycondensation step are provided in the raw material preparation step. An anchor type stirring blade 3a is provided in the raw material mixing tank 2a.

Further, to the raw material mixing tank 2a, DPC as the carbonic diester is supplied in a molten state from a DPC supply port 1a-1, and BPA as the aromatic dihydroxy compound is supplied in a powder state from a BPA supply port 1b, and BPA is melted in a molten DPC.

A first vertical stirring reactor 6a, a second vertical stirring reactor 6b, a third vertical stirring reactor 6c and a fourth vertical stirring reactor 6d which are connected in series, and a fifth horizontal stirring reactor 9a connected to the subsequent stage of the fourth vertical stirring reactor 6d in series are provided in the polycondensation step. MAXBLEND blades 7a, 7b and 7c are provided in the first vertical stirring reactor 6a, the second vertical stirring reactor 6b and the third vertical stirring reactor 6c, respectively. A helical ribbon blade 7d is provided in the fourth vertical stirring reactor 6d. Furthermore, a stirring blade 10a is provided in the fifth horizontal stirring reactor 9a.

Distillation pipes 8a, 8b, 8c, 8d and 8e for discharging by-products or the like formed by polycondensation reaction are fitted to five reactors, respectively. The distillation pipes 8a, 8b, 8c, 8d and 8e are connected to condensers 81a, 81b, 81c 81d and 81e, respectively, and each reactor is maintained in a given reduced pressure state by pressure reducing devices 82a, 82b, 82c, 82d and 82e.

In the production apparatus of an aromatic polycarbonate shown in FIG. 1, a DPC melt prepared at a given temperature in a nitrogen gas atmosphere and a BPA powder weighed in a nitrogen gas atmosphere are continuously supplied to the raw material mixing tank 2a from the DPC supply port 1a-1 and the BPA supply port 1b, respectively.

Next, the molten mixture of raw materials is continuously supplied to the first vertical stirring reactor 6a through the raw material supply pump 4a. Cesium carbonate in a form of an aqueous solution as a catalyst is continuously supplied from the catalyst supply port 5a in the course of a transfer piping of the molten mixture of raw materials.

The first vertical stirring reactor 6a keeps, for example, a temperature of 220° C., a pressure of 13.33 kPa (100 Torr) and the number of revolutions of MAXBLEND blade 7a of 160 rpm in a nitrogen atmosphere, and maintains a liquid level constant such that the average residence time is 60 minutes while distilling by-produced phenol from the distillation pipe 8a, and polycondensation reaction is conducted.

Next, a molten reactant discharged from the first vertical stirring reactor 6a is then continuously supplied to the second vertical stirring reactor 6b, the third vertical stirring reactor 6c, the fourth vertical stirring reactor 6d and the fifth horizontal reactor 9a successively, and polycondensation reaction proceeds. Reaction conditions in each reactor are respectively set to be high temperature, high degree of vacuum and low stirring rate with the progress of polycondensation reaction. During the polycondensation reaction, the liquid level is controlled such that the average residence time in each reactor is, for example, about 60 minutes, and in each reactor, by-produced phenol is distilled from the distillation pipes 8b, 8c, 8d and 8e.

In the present embodiment, by-products such as phenol are continuously liquefied and recovered from the condensers 81a and 81b fitted to the first vertical stirring reactor 6a and the second vertical stirring reactor 6b, respectively. Furthermore, cold traps (not shown) are provided in the condensers 81c, 81d and 81e fitted to the third vertical stirring reactor 6c, the fourth vertical stirring reactor 6d and the fifth horizontal reactor 9a, respectively, and by-products are continuously solidified and recovered.

(Start of Melt Polycondensation in Continuous Production Apparatus)

In the present embodiment, the melt polycondensation based on an ester exchange reaction between an aromatic dihydroxy compound and a carbonic diester is started according to the following procedure.

In the continuous production apparatus shown in FIG. 1, five reactors (first vertical stirring reactor 6a, second vertical stirring reactor 6b, third vertical stirring reactor 6c, fourth vertical stirring reactor 6d and fifth horizontal stirring reactor 9a) connected in series are previously set to inner temperature and degree of vacuum according to melt polycondensation based on an ester exchange reaction, respectively.

The inner temperature and degree of vacuum of each reactor are not particularly limited, and are generally as follows.
(First Vertical Stirring Reactor 6a)
  Inner temperature: 200 to 250° C.
  Degree of vacuum: Normal pressure to 13.3 kPa
(Second Vertical Stirring Reactor 6b)
  Inner temperature: 200 to 250° C.
  Degree of vacuum: 70 kPa to 10 kPa
(Third Vertical Stirring Reactor 6c)
  Inner temperature: 240 to 320° C.
  Degree of vacuum: 10 kPa to 0.1 kPa
(Fourth Vertical Stirring Reactor 6d)
  Inner temperature: 240 to 320° C.
  Degree of vacuum: 1,000 Pa to 1 Pa
(Fifth Horizontal Stirring Reactor 9a)
  Inner temperature: 240 to 320° C.
  Degree of vacuum: 500 Pa to 1 Pa Separately, an aromatic dihydroxy compound and a carbonic diester are mixed in the predetermined molar ratio in the raw material mixing tank 2a in a nitrogen gas atmosphere to obtain a molten mixture of raw materials.

Subsequently, after inner temperature and degree of vacuum of the above-described five reactors reach in a range of from −5% to +5% of the predetermined value, respectively, the molten mixture of raw materials separately prepared in the raw material mixing tank 2a is continuously supplied to the first vertical stirring reactor 6a. Simultaneously with the start to supply the molten mixture of raw materials, a catalyst is continuously supplied to the first vertical stirring reactor 6a from the catalyst supply port 5a to start melt polycondensation based on an ester exchange reaction.

In the first vertical stirring reactor 6a in which melt polycondensation is conducted, liquid level of the molten reactant is maintained constant so as to become the predetermined average residence time. A method of maintaining liquid level in the first vertical stirring reactor 6a constant includes a method of controlling opening of a valve (not shown) provided in a polymer discharge line at the tank bottom.

The average residence time in the first vertical stirring reactor 6a is not particularly limited, and is generally from 30 to 120 minutes.

Subsequently, the molten reactant is discharged from the bottom of the first vertical stirring reactor 6a, and is then continuously supplied to the second vertical stirring reactor 6b, the third vertical stirring reactor 6c, the fourth vertical stirring reactor 6d and the fifth horizontal stirring reactor 9a, successively.

During the melt polycondensation reaction, the liquid level in each reactor is controlled so as to become the predetermined average residence time. The average residence time in each reactor is not particularly limited, and is generally from 30 to 120 minutes.

Phenol simultaneously by-produced with the melt polycondensation reaction in each reactor is distilled away outside the system from distillation pipes (8a, 8b, 8c, 8d and 8e) fitted to each reactor.

As described above, the present embodiment is that in the continuous production apparatus shown in FIG. 1, after inner temperature and pressure of five reactors reach the prescribed values, the molten mixture of raw materials and the catalyst are continuously supplied, and melt polycondensation based on an ester exchange reaction is started.

Due to this, the average residence time of the molten reactant in each reactor is equal to that during a steady operation just after the start of the melt polycondensation. As a result, the molten reactant does not receive thermal history more than necessary, and crystallized foreign matters and foreign matters such as gel and scorch, generated in the aromatic polycarbonate resin obtained are reduced.

(Stop of Melt Polycondensation and Washing of Apparatus in Continuous Production Apparatus)

In the present embodiment, the continuous production of an aromatic polycarbonate resin by melt polycondensation is stopped by the following procedure, and the production apparatus is washed.

In the production apparatus shown in FIG. 1, production operation of an aromatic polycarbonate resin having the predetermined viscosity average molecular weight (Mv1) is conducted for the predetermined period of time (t1), and production of an aromatic polycarbonate resin having a viscosity average molecular weight (Mv2) lower than the viscosity average molecular weight (Mv1) is then conducted for the predetermined period of time (t2). Thereafter, supply of the molten mixture of raw materials and the catalyst is stopped to stop production operation.

The viscosity average molecular weight (Mv1) of the aromatic polycarbonate resin produced in the continuous production operation of the former stage is not particularly limited, and is generally from 15,000 to 40,000. The viscosity average molecular weight (Mv2) of the aromatic polycarbonate resin produced in the continuous production operation of the latter stage is generally preferably from 10,000 to 20,000. The operation time (t2) for producing the aromatic polycarbonate in the latter stage is generally equal to or more than the sum of the residence time (θ) of the all reactors, and is preferably 4θ or more.

A method of producing an aromatic polycarbonate resin having a low viscosity average molecular weight (Mv2) in the latter stage production operation before stopping the continuous production of an aromatic polycarbonate resin by melt polycondensation is not particularly limited, and generally employs a method of increasing a molar ratio of a carbonic diester in the molten mixture of raw materials as compared with the case of the former stage continuous operation.

In the present embodiment, after stopping the continuous operation, the molten reactant can be discharged from the production apparatus described hereinafter in a short period of time by producing an aromatic polycarbonate resin having a low viscosity average molecular weight (Mv2) in the latter stage production operation.

Furthermore, in discharging the molten reactant containing an aromatic polycarbonate resin having a low viscosity average molecular weight (Mv2), high molecular weight components in the production apparatus system are washed away, and washing efficiency of the post-step can be increased. Moreover, due to the increase in the washing efficiency, residual resin in reservoir portions in piping and the like is reduced, and foreign matters such as scorch can be prevented from being generated when restarting.

Subsequently, a washing method of the continuous production apparatus is described.

In the present embodiment, after stopping production operation, the production apparatus shown in FIG. 1 is washed with a molten mixture of an aromatic dihydroxy compound and a carbonic diester, and then washed with an aromatic monohydroxy compound.

In the production apparatus shown in FIG. 1, after stopping the supply of the molten mixture of raw materials and the catalyst, a purge valve (not shown) at the bottom of the fifth horizontal stirring reactor 9a is opened to initiate discharging a molten reactant while connecting five reactors in series. By the start of discharging the molten reactant from the bottom of the fifth horizontal stirring reactor 9a, the molten reactants remained in the first vertical stirring reactor 6a to the fourth vertical stirring reactor 6d are successively sent to the fifth horizontal stirring reactor 9a. Finally, the molten reactant in the fifth horizontal stirring reactor 9a is discharged, thereby all of molten reactants in the production apparatus are discharged.

Thus, in the present embodiment, after stopping production operation, the molten reactants in five reactors are not discharged from the bottom of the respective reactors, but are successively sent to from the first vertical stirring reactor 6a to the fifth horizontal stirring reactor 9a, and finally discharged from the fifth horizontal stirring reactor 9a.

By this, it is not necessary to provide the respective purge valve for discharging a molten reactant at each reactor, thereby making it possible to reduce the number of purge valve. As a result, it is possible to suppress deterioration of a resin due to formation of liquid reservoir at a purge valve and formation of foreign matters due to the same.

Subsequently, pressure in each reactor is recovered, and a valve (not shown) of a transfer pipe which connects each reactor is shut. Next, a molten mixture of raw materials, which a molten mixture of an aromatic dihydroxy compound and a carbonic diester, is supplied as a washing liquid for washing the production apparatus to the first vertical stirring reactor 6a from the raw material mixing tank 2a. In this case, the supply amount of the molten mixture of raw materials supplied to the first vertical stirring reactor 6a is not particularly limited, and is generally an amount or less of the amount supplied at the steady operation.

Next, the molten mixture of raw materials supplied to the first vertical stirring reactor 6a is stirred in the first vertical stirring reactor 6a for the predetermined period of time. The time at which the molten mixture of raw materials is stirred in the first vertical stirring reactor 6a is not particularly limited, and is generally from 0.5 to 12 hours.

Thereafter, a valve (not shown) on a transfer pipe between the first vertical stirring reactor 6a and the second vertical stirring reactor 6b is opened, and the molten mixture of raw materials in the first vertical stirring reactor 6a is sent to the second vertical stirring reactor 6b, and stirred in the second vertical stirring reactor 6b for the predetermined period of time.

Subsequently, the molten mixture of raw materials is successively sent from the second stirring vertical reactor 6b to the third vertical stirring reactor 6c, the fourth vertical stirring reactor 6d and the fifth horizontal stirring reactor 9a, and the similar operation is conducted in the respective reactor.

Finally, the molten mixture of raw materials is discharged from a purge valve (not shown) of the fifth horizontal stirring reactor 9a.

Next, the inner temperature of each reactor is adjusted, and a valve (not shown) connecting each reactor is again shut. The inner temperature is not particularly limited, and is generally from 150 to 200° C.

Subsequently, phenol which is an aromatic monohydroxy compound as a washing liquid for washing the production apparatus is supplied to the first vertical stirring reactor 6a, and stirred under slightly reduced pressure for the predetermined period of time. In this case, the amount of phenol supplied to the first vertical stirring reactor 6a is not particularly limited, and is generally about 0.1 to 1.5 times the amount of the raw material liquid supplied at a steady operation. The pressure of the first vertical stirring reactor 6a is generally from 101.3 to 33.3 kPa. Time that phenol is stirred in the first vertical stirring reactor 6a is not particularly limited, and is generally from 0.5 to 24 hours.

Next, a valve (not shown) on a transfer pipe between the first vertical stirring reactor 6a and the second vertical stirring reactor 6b is opened, and the phenol in the first vertical stirring reactor 6a is sent to the second vertical stirring reactor 6b, and stirred in the second vertical stirring reactor 6b for the predetermined period of time.

Subsequently, the phenol is successively sent from the second vertical stirring reactor 6b to the third vertical stirring reactor 6c, the fourth vertical stirring reactor 6d and the fifth horizontal vertical stirring reactor 9a, and the similar operation is conducted in the respective reactor. Finally, the phenol is discharged as a phenol waste liquid from a purge valve (not shown) of the fifth horizontal stirring reactor 9a.

Thus, in the present embodiment, after stopping the production operation, the inside of the production apparatus is first washed with a molten mixture of an aromatic dihydroxy compound and a carbonic diester as raw material monomers. By this, depolymerization of polymers remained in the production apparatus is accelerated, and by discharging a molten mixture of raw material monomers, almost all of polymers remained can be removed.

Furthermore, in the washing with phenol subsequently conducted, it is possible to reduce the amount of phenol used, and additionally it is possible to shorten the washing time.

Furthermore, in the present embodiment, in continuously producing an aromatic polycarbonate resin by the continuous production apparatus equipped with plural reactors shown in FIG. 1, the following procedures are preferred. According to the above-described procedures, after a steady operation, an aromatic polycarbonate resin having a low viscosity average molecular weight (Mv2) as compared with an aromatic polycarbonate resin produced in a steady operation is produced in the latter stage production operation conducted for the predetermined period of time. After stopping the continuous operation, the inside of the apparatus from which a molten reactant has been discharged is washed with a molten mixture of an aromatic dihydroxy compound and a carbonic diester and then with an aromatic monohydroxy compound. Next, in restarting the same production apparatus, according to the above-described procedures, inner temperature and pressure of plural reactors are set to the predetermined values at a steady operation, after the inner temperature and pressure of those reactors reach the predetermined values, a molten mixture of raw materials and a catalyst are continuously supplied to the reactor, and melt polycondensation based on an ester exchange reaction is started.

The present invention is described further specifically based on the Examples. However, the present invention is not limited to the following Examples so far as it does not depart from its gist. Polycarbonates obtained in the Examples and the Comparative Examples were analyzed by the following measurement methods.

(1) Viscosity Average Molecular Weight (Mv)

A viscosity average molecular weight (Mv) was obtained by preparing a methylene chloride solution of an aromatic polycarbonate (concentration (C): 0.6 g/dl), measuring a specific viscosity ($\eta sp$) of this solution at a temperature of 20° C. using Ubbellohde viscometer, and calculating by the following equations.

$$\eta sp/C = [\eta]/(1+0.28\eta sp)$$

$$[\eta] = 1.23 \times 10^{-4} Mv^{0.83}$$

(2) Number (N) of Transparent Foreign Matters of 10 μm or More (Unit: Number/g)

An aromatic polycarbonate was dried at 120° C. for 6 hours or longer in a nitrogen atmosphere, and film-formed into a film having a thickness of 70 μm using a single-screw 30 mm extruder (manufactured by Isuzu Kakoki Co., Ltd.). Five sheets each having a size of 9 cm×50 cm (about 4 g) were cut out of this sheet. Core-free transparent foreign matters (=fish eye) were marked on each sheet, and size and number of those transparent foreign matters were measured using a stereomicroscope of 200 magnifications.

In the measurement, planar boundary of core-free transparent foreign matter was determined by the difference in refractive index to circumference, and its size was considered as the maximum distance between two points on the planar boundary line. The total of transparent foreign matters having a size of 10 μm was counted, and the number of foreign matters per 1 g was calculated, and used as "number (N) of transparent foreign matters of 10 μm or more".

(3) Inspection of Film Appearance

The film prepared in (2) above was visually observed, and the appearance was evaluated by the following criteria.

Good: Film surface is transparent and uniform.

Poor: Film surface is opaque or rough.

(4) Plate Color Tone (YI)

A flat plate (60 mm×60 mm×3.2 mm) of an aromatic polycarbonate was formed by injection molding (barrel temperature: 360° C., mold temperature: 80° C.), and yellow index (YI) of this flat plate was measured with a spectrophotometric instrument (CM-3700d, a product of Minolta Co., Ltd.). Color tone is good as the value is small.

Example 1

An aromatic polycarbonate was produced by the continuous production apparatus having four vertical stirring reactors and one horizontal stirring reactor shown in the above-mentioned FIG. 1 under the following conditions.

Each reactor was previously set to inner temperature and degree of vacuum according to the predetermined conditions as follows.

(First vertical stirring reactor 6a): 220° C., normal pressure
(Second vertical stirring reactor 6b): 220° C., 13.3 kPa
(Third vertical stirring reactor 6c): 240° C., 2 kPa
(Fourth vertical stirring reactor 6d): 270° C., 67 Pa
(Fifth horizontal stirring reactor 9a): 290° C., 67 Pa Separately, bisphenol A (BPA) and diphenyl carbonate (DPC) were mixed in a constant molar ratio (DPC/BPA=1.040) in a nitrogen gas atmosphere in the raw material preparation step, and heated at 140° C. to obtain a molten mixture of raw materials.

Subsequently, the molten mixture of raw materials was continuously supplied to the first vertical stirring reactor 6a having the temperature and pressure controlled in a range of ±5% of the above-mentioned predetermined temperature and degree to vacuum through a raw material introduction pipe heated to 140° C., and the liquid level was maintained constant while controlling opening of a valve (not shown) provided in a polymer discharge line of the bottom such that the average residence time is 60 minutes.

Simultaneously with starting the supply of the molten mixture of raw materials, a cesium carbonate aqueous solution as a catalyst was continuously supplied to the first vertical stirring reactor 6a from a catalyst supply port 5a in a proportion of 0.35 μmol per mole of bisphenol A.

A molten reactant discharged from the bottom of the first vertical stirring reactor 6a was then continuously supplied to the second vertical stirring reactor 6b, the third vertical stirring reactor 6c, the fourth vertical stirring reactor 6d and the fifth horizontal stirring reactor 9a, successively.

During the polymerization reaction, the liquid level was controlled such that the average residence time in each reactor is 60 minutes, and phenol by-produced simultaneously with the polymerization reaction was distilled away. Production rate of an aromatic polycarbonate is 50 kg/hr. The aromatic polycarbonate thus obtained had a viscosity average molecular weight (Mv) of 25,000.

Next, the molten reactant discharged from the fifth horizontal stirring reactor 9a was introduced into a twin-screw extruder (L/D=42, barrel temperature: 240° C.) in a molten state with a gear pump, and 7 ppm of butyl p-toluenesulfonate was added thereto. The molten reactant was pelletized through a polymer filter (leaf disc type).

The polymer filter used here is that 135 woven metal wire-made leaf discs having an absolute filtration accuracy of 40 μm are put on a center post. In the use, before passing a molten reactant through the polymer filter, the polymer filter was previously heated to 280° C. at a flow rate of 5 ml/min for 36 hours in a nitrogen atmosphere, and then used. The pellets thus obtained were molded into a film and a plate, and the number (N) of transparent foreign matters of 10 μm or more, film appearance inspection and plate color tone (YI) were measured on the film and plate. The results are shown in Table 1.

Example 2

After conducting the production operation of an aromatic polycarbonate by the continuous production apparatus shown in FIG. 1 for 100 hours under the same conditions as in Examples 1, the molar ratio of BPA and DPC was changed DPC/BPA=1.060, the inner temperature of the fourth vertical stirring reactor 6d was changed 260° C., the inner temperature of the fifth horizontal stirring reactor 9a was changed 265° C., and the production operation was further conducted for 24 hours, thereby obtaining an aromatic polycarbonate having a viscosity average molecular weight (Mv) of 15,000.

Thereafter, the supply of the molten mixture of raw material and the catalyst was stopped, and the molten reactant in the reactor was successively discharged from the first vertical stirring reactor 6a. Subsequently, pressure in each reactor was recovered, and 20 kg of the molten mixture of raw materials was supplied to the first vertical stirring reactor 6a from the raw material mixing tank 2a.

After stirring the molten mixture of raw materials in the first vertical stirring reactor 6a for 2 hours, the molten mixture of raw materials in the first vertical stirring reactor 6a was transferred to the second vertical stirring reactor 6b, and stirred therein for 2 hours. Subsequently, the same operation was performed in the third vertical stirring reactor 6c, the fourth vertical stirring reactor 6d and the fifth horizontal stirring reactor 9a, successively, and finally the molten mixture of raw materials was discharged from a purge valve (not shown) of the fifth horizontal stirring reactor 9a.

Temperature of each reactor was set to 180° C., 60 kg of phenol was supplied to the first vertical stirring reactor 6a and stirred therein for 5 hours under slightly reduced pressure, and the phenol was then transferred to the second vertical stirring reactor 6b. Subsequently, the same operation was performed in the third vertical stirring reactor 6c, the fourth vertical stirring reactor 6d and the fifth horizontal stirring reactor 9a, successively, and finally phenol waste liquid was withdrawn from the fifth horizontal stirring reactor 9a.

One month later, continuous polymerization operation of an aromatic polycarbonate was conducted using the continuous production apparatus to which the above-described washing operation had been conducted, under the same conditions as in Example 1. The pellets thus obtained were molded into a film and a plate, and the number (N) of transparent foreign matters of 10 μm or more, film appearance inspection and plate color tone (YI) were measured on the film and plate. The results are shown in Table 1.

Comparative Example 1

In the continuous production apparatus shown in FIG. 1, each reactor was set to 140° C. and normal pressures. Next, a molten mixture of BPA and DPC as raw materials was supplied to each reactor so as to become the predetermined liquid level. Subsequently, each reactor was set to the same temperature and pressure as in Example 1, and after each reactor reached the predetermined temperature and pressure, the molten mixture was stirred for 60 minutes. Thereafter, continuous polymerization was started, and continuous polymerization operation was conducted under the same conditions as in Example 1.

The pellets thus obtained were molded into a film and a plate, and the number (N) of transparent foreign matters of 10 μm or more, film appearance inspection and plate color tone (YI) were measured on the film and plate. The results are shown in Table 1. Twenty hours were required until the same plate color tone (YI) as in Example 1 was obtained.

Comparative Example 2

In Comparative Example 1, the molten mixture of BPA and DPC as raw materials was supplied to only the first vertical stirring reactor 6a up to the predetermined liquid level. Next, the temperature and pressure of the first vertical stirring reactor 6a were set to the same conditions as in Example 1, and after reaching the predetermined temperature and pressure, the molten mixture was stirred for 60 minutes. Thereafter, simultaneously with starting the supply of the molten mixture of raw materials to the second vertical stirring reactor 6b, a molten mixture of raw material was supplied to the first vertical stirring reactor 6a from the raw material mixing tank 2a, and continuous polymerization operation was conducted under the same conditions as in Example 1.

The pellets thus obtained were molded into a film and a plate, and the number (N) of transparent foreign matters of 10 μm or more, film appearance inspection and plate color tone (YI) were measured on the film and plate. The results are shown in Table 1.

TABLE 1

| | Example 1 | Example 2 | Comparative Example 1 | Comparative Example 2 |
|---|---|---|---|---|
| Viscosity average molecular weight (Mv) | 25,000 | 25,100 | 24,500 | 24,800 |
| Number of transparent foreign matters of 10 μm or more (N) | 30 | 5 | 500 | 1,200 |
| Film appearance inspection | Good | Good | Poor | Poor |
| Plate color tone (YI) | 1.5 | 1.4 | 2.2 | 1 |

It is seen from the results shown in Table 1 that in the continuous production apparatus shown in FIG. 1, by starting melt polymerization based on an ester exchange reaction after the inner temperature and pressure of five reactors reached the predetermined values, an aromatic polycarbonate resin having less number (N) of transparent foreign matters of 10 μm or more, and having good film appearance inspection and plate color tone (YI) is obtained (Example 1).

Furthermore, it is seen that in the continuous production apparatus shown in FIG. 1, after stopping the production operation, by washing the inside of the production apparatus with a molten mixture of raw material monomers and then washing with phenol, an aromatic polycarbonate resin having less number (N) of transparent foreign matters of 10 μm or more, and having good film appearance inspection and plate color tone (YI) is obtained (Example 2).

On the other hand, it is seen that where the inner temperature and pressure of a reactor are not set to values at a steady operation (Comparative Example 1) and in the case of the batch start (Comparative Example 2), a good aromatic polycarbonate is not obtained.

As described in detail above, in the present embodiment, by carrying out both the starting method and stopping method as described above in a method of continuously producing an aromatic polycarbonate resin, it is possible to produce an aromatic polycarbonate resin showing good color tone from the start time and having less foreign matters.

Furthermore, the aromatic polycarbonate resin thus obtained can suitably be used in building materials such as sheets, vessels such as bottles for water, optical lenses such as head lamp lenses for automobiles and eyeglass lens, optical recording materials such as optical discs, light guide plates such as liquid crystal display, and the like.

While the invention has been described in detail and with reference to specific embodiments thereof, it will be apparent to one skilled in the art that various changes and modifications can be made therein without departing from the spirit and scope thereof.

This application is based on Japanese Patent Application (Patent Application No. 2006-340464) filed Dec. 18, 2006, the entire contents thereof being hereby incorporated by reference.

INDUSTRIAL APPLICABILITY

According to the production method of an aromatic polycarbonate resin of the present invention, a polycarbonate resin showing less coloration and having reduced crystallized foreign matters and foreign matters such as gels is obtained. Therefore, the industrial value of the present invention is remarkable.

The invention claimed is:

1. A production method for a polycarbonate resin which comprises:
   continuously producing a polycarbonate resin by an ester exchange reaction using a dihydroxy compound and a carbonic diester as raw materials,
   wherein
   before stopping the ester exchange reaction, a polycarbonate resin having a viscosity average molecular weight of from 10,000 to 20,000 is continuously produced for the predetermined period of time, and
   after stopping the ester exchange reaction, a reactor in which the ester exchange reaction is conducted is washed with a molten mixture of the dihydroxy compound and the carbonic acid diester, and the reactor is further washed with an aromatic monohydroxy compound.

2. The production method for a polycarbonate resin as claimed in claim 1, wherein the dihydroxy compound is an aromatic dihydroxy compound.

3. The production method for a polycarbonate resin as claimed in claim 1 or 2, wherein before washing the reactor, polymerization reaction liquid is discharged from the reactor.

4. A method to produce an aromatic polycarbonate, comprising:
   supplying a molten raw material mixture comprising an aromatic dihydroxy compound, diphenyl carbonate, and an ester exchange catalyst to a first reactor of a multi-reactor set;
   preparing the aromatic polycarbonate by a continuous multi-stage ester exchange reaction of an aromatic dihydroxy compound and diphenyl carbonate, in the presence of an ester exchange catalyst, in the multi-reactor set;
   wherein
   a viscosity average molecular weight of the aromatic polycarbonate produced is from 15,000 to 40,000,
   a temperature of the continuous multi-stage ester exchange reaction is from 150 to 320° C., with each successive stage of the multi-stage reaction having a temperature higher than the previous stage,
   a pressure of the continuous multi-stage ester exchange reaction is from normal pressure to 0.01 Torr, with each successive stage of the multi-stage reaction being under a higher vacuum than the previous stage,
   wherein
   in a stopping of the method, the molten ester exchange reaction mixture is discharged only from a purge valve in the last reactor of the multi-reactor set, and
   an aromatic polycarbonate resin having a viscosity average molecular weight of from 10,000 to 20,000 and less than the viscosity average molecular weight of the prepared aromatic polycarbonate resin is continuously produced for a predetermined period of time and discharged.

5. The method according to claim 4, further comprising:
   after stopping the ester exchange reaction, washing the multi-reactor set with a molten mixture of the aromatic dihydroxy compound and diphenyl carbonate; and
   discharging the molten mixture of the aromatic dihydroxy compound and diphenyl carbonate only from the purge valve in the last reactor of the multi-reactor set.

6. The method according to claim 5, further comprising,:
   after washing the multi-reactor set with the molten mixture of the aromatic dihydroxy compound and diphenyl carbonate, washing the multi-reactor set with phenol; and
   discharging the phenol only from the purge valve in the last reactor of the multi-reactor set.

* * * * *